US010374758B2

(12) United States Patent
Ma et al.

(10) Patent No.: US 10,374,758 B2
(45) Date of Patent: Aug. 6, 2019

(54) METHOD AND APPARATUS FOR CONTROLLING HANDSHAKE IN A PACKET TRANSMISSION NETWORK

(71) Applicant: SIGNIFY HOLDING B.V., Eindhoven (NL)

(72) Inventors: Fulong Ma, Eindhoven (NL); Sye Long Keoh, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 31 days.

(21) Appl. No.: 15/303,533

(22) PCT Filed: Apr. 10, 2015

(86) PCT No.: PCT/EP2015/057794
§ 371 (c)(1),
(2) Date: Oct. 12, 2016

(87) PCT Pub. No.: WO2015/158613
PCT Pub. Date: Oct. 22, 2015

(65) Prior Publication Data
US 2017/0033889 A1 Feb. 2, 2017

(30) Foreign Application Priority Data
Apr. 15, 2014 (EP) .................... 14164789

(51) Int. Cl.
*H04L 1/20* (2006.01)
*H04L 1/16* (2006.01)
(Continued)

(52) U.S. Cl.
CPC ............ *H04L 1/206* (2013.01); *H04L 1/0016* (2013.01); *H04L 1/203* (2013.01); *H04L 5/0055* (2013.01);
(Continued)

(58) Field of Classification Search
CPC ..... H04L 69/169; H04L 69/164; H04L 1/203; H04L 67/42
See application file for complete search history.

(56) References Cited

U.S. PATENT DOCUMENTS

2002/0150048 A1   10/2002  Ha et al.
2002/0154602 A1*  10/2002  Garcia-Luna-Aceves .................
                                        H04L 1/1832
                                        370/230
(Continued)

FOREIGN PATENT DOCUMENTS

FR    2960372 A1    11/2011
JP    09298605 A    11/1997
(Continued)

OTHER PUBLICATIONS

Thomas Kothmayr et al, "ADTS Based End-to-End Security Architecture for the Internet of Things with Two-Way Authentication", Dept. of Computer Science, Chair for Network Architectures and Services, Technische Universitat Munchen, Germany.

*Primary Examiner* — Omer S Mian

(57) ABSTRACT

The present invention relates to a method and apparatus for controlling a handshake operation. Datagram Transport Layer Security (DTLS) is an important secure protocol in the IP based Internet of things. The performance of DTLS handshake can be significantly affected by network status, traffic and packet loss rate, etc. It is therefore suggested evaluating a package loss rate and estimating causes of packet loss. Then, a DTLS handshake strategy may be changed adaptively based on the detection of packet loss and network status. As a result, the successful rate and delay of DTLS handshake can be improved. An acknowledgement and a non-acknowledgement mode may be used in a hybrid (Continued)

way to evaluate the package loss rate and estimate causes of packet loss and eventually improve performance of DTLS handshake.

13 Claims, 7 Drawing Sheets

(51) Int. Cl.
*H04L 1/00* (2006.01)
*H04L 5/00* (2006.01)
*H04L 29/06* (2006.01)
*H04W 24/02* (2009.01)
*H04L 29/08* (2006.01)

(52) U.S. Cl.
CPC ............ *H04L 67/42* (2013.01); *H04L 69/164* (2013.01); *H04L 69/168* (2013.01); *H04L 69/169* (2013.01); *H04W 24/02* (2013.01); *H04L 1/0002* (2013.01); *H04L 1/16* (2013.01); *H04L 67/12* (2013.01); *H04L 69/326* (2013.01)

(56) References Cited

U.S. PATENT DOCUMENTS

| 2009/0161546 | A1 | 6/2009 | Key et al. |
| 2010/0039937 | A1 | 2/2010 | Ramanujan et al. |
| 2011/0093710 | A1* | 4/2011 | Galvin ................ H04L 63/061 713/169 |
| 2013/0138827 | A1 | 5/2013 | Loach |
| 2014/0325064 | A1* | 10/2014 | Johansson ............... H04L 47/12 709/225 |
| 2015/0095508 | A1* | 4/2015 | Somayazulu ........ H04N 21/631 709/231 |

FOREIGN PATENT DOCUMENTS

| JP | 2005117232 A | 4/2005 |
| JP | 2010081554 A | 4/2010 |
| JP | 2013005024 A | 1/2013 |
| WO | 2013014609 A1 | 1/2013 |
| WO | 2013054335 A2 | 4/2013 |
| WO | 2013113978 A1 | 8/2013 |

* cited by examiner

METHOD AND APPARATUS FOR CONTROLLING HANDSHAKE IN A PACKET TRANSMISSION NETWORK

CROSS-REFERENCE TO PRIOR APPLICATIONS

This application is the U.S. National Phase application under 35 U.S.C. § 371 of International Application No. PCT/EP2015/057794, filed on Apr. 10, 2015, which claims the benefit of European Patent Application No. 14164789.1, filed on Apr. 15, 2014. These applications are hereby incorporated by reference herein.

FIELD OF THE INVENTION

The invention relates to the field of a method and an apparatus for controlling handshake in a packet transmission network, such as—but not limited to—a handshake operation in a Datagram Transport Layer Security (DTLS) environment.

BACKGROUND OF THE INVENTION

Internet Protocol version 6 (IPv6) offers interconnection of almost every physical object with the Internet. This leads to tremendous possibilities to develop new applications, such as home automation and home security management, lighting systems, smart energy monitoring and management, item and shipment tracking, surveillance and military, smart cities, health monitoring, logistics monitoring and management. With the introduction of Internet Protocol (IP) version 6 over low-power wireless personal area networks (6LoW-PAN) in wireless sensor networks (WSNs), resource constrained devices can be connected to the Internet. This hybrid network of the Internet and the IPv6 connected constrained devices form the so-called "Internet of Things" (IoT). Unlike the Internet where devices are mostly powerful and unlike typical WSN where devices are mostly resource constrained, the things in the IoT are extremely heterogeneous. An IoT device can be a typical sensor node, a light bulb, a microwave oven, an electricity meter, an automobile part, a smartphone, a personal computer (PC) or a laptop, a powerful server machine or even a cloud.

Due to the low-powered and lossy nature of wireless networks in the IoT, the connection-less User Datagram Protocol (UDP), instead of stream-oriented Transmit Control Protocol (TCP), is mostly used in the IoT. The synchronous Hyper Text Transfer Protocol (HTTP) is designed for TCP and is infeasible to use in the UDP-based IoT. Therefore, the Constrained Application Protocol (CoAP), a subset of HTTP is being standardized as a web protocol for the IoT. CoAP is tailored for constrained devices and for machine-to-machine communication. Furthermore, although Internet Protocol Security (IPsec) can be used in the IoT it is not primarily designed for web protocols such as HTTP or CoAP. For web protocols the Transport Layer Security (TLS) or its predecessor Secure Sockets Layer (SSL) is the most common security solution. However, the connection-oriented TLS protocol can only be used over stream-oriented TCP that is not the preferred method of communication for smart objects. Due to lossy nature of low-power wireless networks it is hard to maintain a continuous connection in 6LoWPAN networks.

An adaptation of TLS for UDP is called Datagram TLS (DTLS). DTLS guarantees end-to-end (E2E) security of different applications on one machine by operating between transport and application layers. DTLS in addition to TLS that provides authentication, confidentiality, integrity, and replay protection, also provides protection against Denial of Service (DoS) attacks with the use of cookies. Though DTLS provides application level E2E security, it can only be used over the UDP protocol. The secure web protocol for the IoT, Secure CoAP (CoAPs), mandates the use of DTLS as the underlaying security solution for CoAP. Therefore, it is necessary to enable DTLS support in the IoT, e.g., for security issues sich as bootstrapping. The term "bootstrapping" is derived from its use since about 2005 in the 6LoWPAN working group of the IETF. It can be defined as the process of configuring a node to enable it to participate in normal network operation. But may be more strikingly, in general usage the process of bootstrapping means setting up a complicated software environment in several steps, starting from something very primitive (such as a diode-matrix ROM bootstrap in early computing). Transferring this notion to security bootstrapping, and combining it with the above definition, it might stand for the setup of a robustly secure node configuration using some primitive initial keying materials and security procedures.

During DTLS handshake, a client and server agree on various parameters used to establish a connection's security. As an example, in IP based lighting networks, DTLS handshake is used to commission lighting devices during commissioning.

FIG. 1 shows a signalling diagram with typical DTLS handshake with certificate between a client (C) and a server (S). The numbers in brackets after each message part indicate the individual lengths of these parts in Bytes.

To set up a new connection and negotiate the security parameters a handshake protocol is used. The client initiates the handshake by sending a ClientHello message to the server. This message contains supported cipher suites, hash and compression algorithms and a random number. The server is supposed to respond with a ServerHello, which contains the cipher suite and algorithms the server has chosen from the ones the client offered and also a random number. Both random numbers will be used, among other data, to calculate the master secret. The server may continue with a server certificate message including its certificates to authenticate itself, if necessary. In that case it can also send a CertifcateRe quest message, to provoke the client to authenticate, too. For some cipher suites additional data may be necessary for the calculation of the secret, which can be send with a ServerKeyExchange message. Since the last three messages mentioned are optional, a ServerHelloDone message indicates when no more messages follow from the server.

This part of the handshake is a problem with connection-less transport protocols, because there is no transport connection setup necessary and an attacker could just send many ClientHellos to a server. This could be used for a denial of service (DOS) attack against the server, which will start a new session, thus allocating resources, for every ClientHello, or against another victim by redirecting the much larger response of the server to it, thus multiplying the attacker's bandwidth. To prevent this issue, DTLS uses an additional handshake message, called HelloVerifyRequest. It is sent in response to the ClientHello message and contains a so-called cookie of arbitrary data, preferably signed. The server will only send this message without allocating any resources. The client then has to repeat with a ClientHello* message with the cookie attached. If the cookie can be verified, hence the signature, the server knows that the client has not used a faked address, and since the HelloVerifyRequest message is small and has to be answered before the server sends any more data, no DOS attacks are possible anymore. After this verifcation the handshake will be continued as before.

After the ServerHelloDone message, the client has to send its certifcates with a ClientCertifcate message if the server requested authentication. This is followed by a ClientKeyExchange message, which contains its public key or other cryptographic data, depending on the cipher suite used. Also depending on the cipher suite is whether a CertifcateVerifY message to verify a signed certifcate has to be sent. At this point both peers have enough information to calculate the master secret. Thus, the client sends a ChangeCipherSpec message to announce that the negotiated parameters and the secret will be used from now on. Its last message is the Finished message, which contains a hash calculated over the entire handshake and is encrypted already. The server concludes the handshake by also sending the ChangeCipherSpec and Finished messages.

Since DTLS handshake aims to initiate the security connections, it is very critical to have a successful DTLS handshake to start communication. The performance of DTLS handshake, such as delay and successful rate, very much depends on the network status such as congestion, wireless loss, packet loss rate, etc. It also depends on the security modes of the DTLS handshake, for example, DTLS with Pre-Shared Key (PSK), raw public key or certificates since the different modes have different number of packets to be transmitted.

The delay increases with increasing packet loss rate. For the DTLS-certificate mode where more packets are needed to be transmitted, the delay increase faster than other modes. The PSK with return acknowledgement mode sends one packet once and waits for the reply of acknowledgement. If there is no ACK returned, the packet will be sent again. Consequently, the delay of this mode is much bigger than the other PSK methods.

Since DTLS handshake aims to initiate security connections, it is very critical to have a successful DTLS handshake to start communication. As DTLS handshake is used in UDP communication, the packets for DTLS handshake can be lost in the transmission. To ensure reliable receiving, a DTLS with acknowledgement (ACK) can be used, where an ACK message is generated and sent by the receiver. However the ACK packet can also be lost. When there are some sorts of packet loss, such as wireless loss or congestion loss, the handshake delay can be prolonged. When there are more messages to be sent, such as certificates, etc, the delay can be much bigger which will lower the success rate of handshake. Hence, DTLS with acknowledgement generates more delay especially when transmitting more packets. Furthermore, channel packet loss and loss rate are not easy to measure.

Thus, current DTLS handshake modes or strategies have different performances in different packet loss rates. The causes of packet loss also have significant impacts on the DTLS handshake. It is therefore necessary to take into account the causes of packet loss such as congestion loss and wireless loss to achieve better success rate of DTLS handshake and improve the performance of DTLS handshake. Especially for DTLS handshake with certificates, there are more packets to be exchanged during DTLS handshake. The packet loss modes and packet loss rate have big impact on the success rate of DTLS and handshake delay.

This invention aims to propose a dynamic ACK to shorten the delay and use the ACK to estimate the packet loss and adjust the transmission strategy.

SUMMARY OF THE INVENTION

It is an object of the present invention to provide a handshake operation with improved performance.

This object is achieved by an apparatus as claimed in claim 1, by a method as claimed in claim 11, and by a computer program product as claimed in claim 12.

Accordingly, the handshake performance can be improved in packet based networks by calculating a network packet loss rate and estimating causes of network packet loss, so as to change a handshake strategy based on the detection of packet loss and possible causes. As a result, the successful rate of handshake can be increased and handshake delay can be reduced.

According to a first option, the detector may be adapted to detect the packet loss based on a sequence of received packets. In a more specific exemplary DTLS environment, the detector may be adapted to detect the packet loss based on a sequence of ClientHello messages of the DTLS handshake signaling. Thereby, a straight forward approach can be provided to detect packet loss.

According to a second option which can be combined with the first option, the detector may be adapted to estimate a congestion loss as the cause of the detected packet loss if a delay between received continuous packets varies or if there is a disorder between received continuous packets. This measure enables reliable estimation of congestion as a cause for detected packet loss.

According to a third option which can be combined with the above second option, the detector may be adapted to estimate a wireless loss if the detected packet loss is distributed randomly or if a delay between received continuous packets is almost equal. This measure enables reliable estimation of wireless loss as a cause for detected packet loss.

According to a fourth option which can be combined with the above second option, if the detector has estimated a wireless loss, then the controller may be adapted to estimate a packet loss rate, to estimate a remaining time for handshake based on the packet loss rate, to compare the remaining time with a predetermined handshake timeout, and to increase a transmission rate of the packet transmission proportional to a ratio the between the estimated remaining time for handshake and the predetermined handshake timeout if the estimated remaining time is smaller than the predetermined handshake timeout. Thus, the handshake strategy can be adapted to wireless loss as the cause of packet loss to thereby improve handshake performance.

According to a fifth option which can be combined with the above third option, if the detector (S1, C1) has estimated a congestion loss, then the controller may be adapted to estimate a packet loss rate, to estimate a remaining time for handshake based on the packet loss rate, to compare the remaining time with a predetermined handshake timeout, and to increase a transmission interval and decrease a transmission rate of the packet transmission if the estimated remaining time is smaller than the predetermined handshake timeout. Thus, the handshake strategy can be adapted to congestion as the cause of packet loss to thereby improve handshake performance.

According to a sixth option which can be combined with the above third or fifth options, if the detector has estimated a congestion loss and if the apparatus is located on a server side of the packet transmission, then the controller may be adapted to notify a client side of the packet transmission to prolong the handshake timeout. Thereby, handshake timeout is prolonged in case of congestion loss to thereby reduce the transmission rate so as to possibly remove the congestion situation.

According to a seventh option which can be combined with any one of the above first to sixth options, the controller may be adapted to estimate the packet loss rate by calculating a total transmission time until receiving the last acknowledgement of a predetermined handshake message and using the equation $$P_L = 1 - \frac{2}{\sqrt{N_s}},$$

wherein $N_S$ denotes the calculated total transmission time and $P_L$ denotes the estimated packet loss rate. Thus, handshake performance can be improved by using a hybrid transmission method in such a way that only specific handshake messages are required to be acknowledged. Messages with long packets do not need to be acknowledged, which shortens the delay of handshake. Furthermore, the acknowledgements can be used to estimate the packet loss rate. The calculated packet loss rate is used to adjust the transmission strategy. In a specific DTLS based example, the predetermined handshake message may be a ClientHello message of a DTLS handshake signaling.

It is noted that the above system may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the system of claim 1, the method of claim 11, and the computer program product of claim 12 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a DTLS handshake with adaptively changed handshake strategy between a server and a client.

Figure 1:
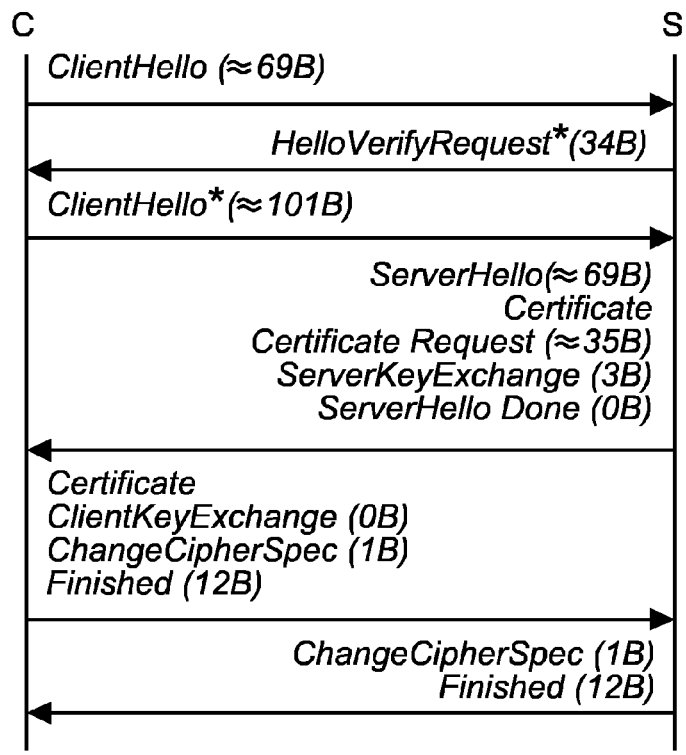
FIG. 1 shows a schematic signaling diagram of a DTLS handshake with certificate.
Figure 2:
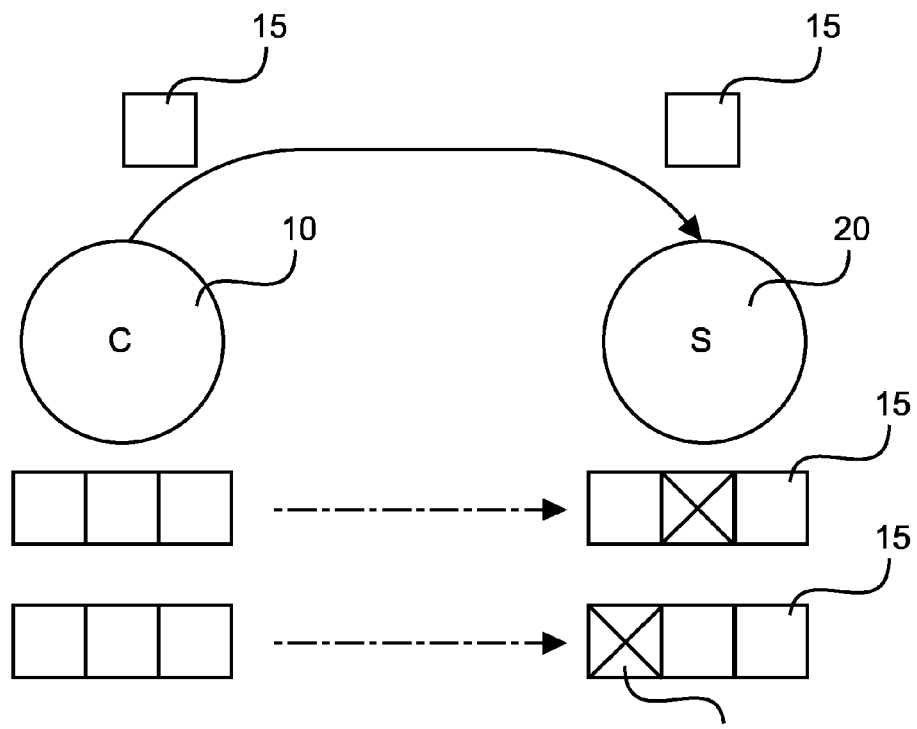
FIG. 2 shows a schematic block diagram of a non-acknowledged packet transmission between a client and server according to a first embodiment.

FIG. 2 shows a schematic block diagram of a non-acknowledged packet transmission between a client (C) 10 and server (S) 20 according to a first embodiment. In the case of FIG. 2, packets 15 are transmitted from the client 10 to the server 20. The server checks the sequence of received packets in order to determine lost packets 17.

Figure 3:
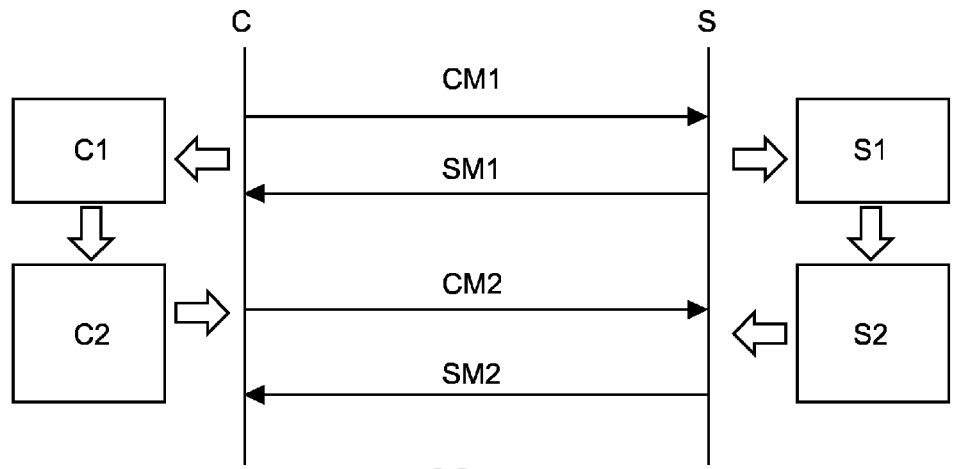
FIG. 3 shows a schematic system architecture of a handover control scheme for the non-acknowledged packet transmission between a client and server according to the first embodiment.

FIG. 3 shows a schematic system architecture of a handover control scheme for the non-acknowledged packet transmission between the client and the server according to the first embodiment. In both server and client sides there are two functional blocks. The first functional block is a detection block (or detector) C1, S1 for detection of packet loss. This functional block detects the packet loss based on the received packets and estimates a packet loss rate. The second functional block is a control block (or controller) C2, S2 for changing a transmission and receiving strategy (i.e. handshake strategy) for client messages CM1 and CM2 and for server messages SM1 and SM2 between the client (C) and the server (S). This functional block is adapted to change the handshake strategy according to the detected packet loss.

Because DTLS handshake messages may be lost, DTLS needs a mechanism for retransmission. DTLS implements retransmission using a single timer at each endpoint. Each end-point keeps retransmitting its last message until a reply is received. According to the DTLS protocol, an initial timer value for the predetermined handshake timeout can be set to 1s (the minimum is defined in RFC 2988) and the value can be doubled at each retransmission, up to no less than a maximum of 60 seconds (as defined in RFC 2988). The current timer value can be retained until a transmission without loss occurs, at which time the value may be reset to the initial value. After a long period of idleness, no less than 10 times the current timer value, the timer may be reset to the initial value. One situation where this might occur is when a re-handshake is used after substantial data transfer.

Figure 4:
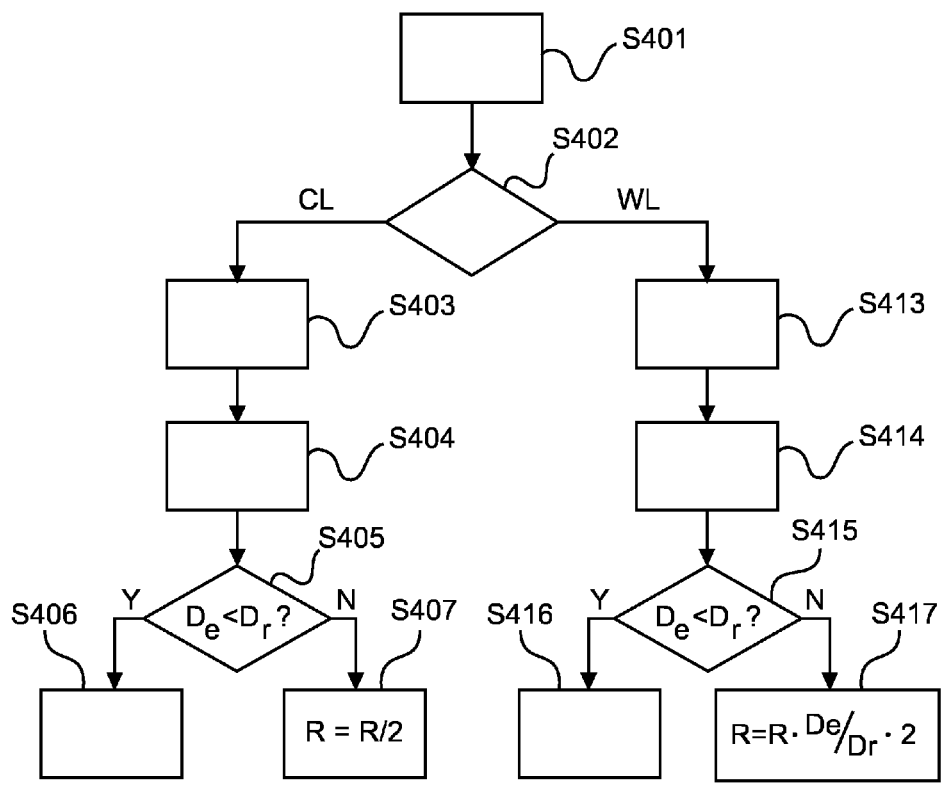
FIG. 4 shows a flow diagram of a server side processing of the handover control scheme for the non-acknowledged packet transmission according to the first embodiment.

FIG. 4 shows a flow diagram of a server side processing of the handover control scheme for the non-acknowledged packet transmission according to the first embodiment. More specifically, the processing of FIG. 4 relates to a packet loss detection and strategy changing mechanism on the server side.

In step S401, the server detects the packet loss based on the received packets of ClientHello and ClientHello* messages of a handshake procedure according to the DTLS protocol (i.e. DTLS handshake). Since each packet has a serial number, the server can detect the packet loss from the sequence of the packets.

Then, in step S402, a decision on the type of packet loss is made. This process determines the type of loss according to the following criteria:

Is there disorder between received ClientHello and ClientHello* messages? If yes, there is congestion loss.
Does the delay between two continuously received packets vary? If yes, there is congestion loss.
Is the packet loss distributed randomly or is the delay almost equal? If yes, there is wireless loss.

If a wireless loss is determined in step S402, the procedure branches to step S413 where the packet loss rate is estimated based on received packets by using the following equation:

$$\widetilde{PL} = \frac{\text{Number of lost packets}}{\text{Total number of expected received packets}} \quad (1)$$

Then, in step S414, the remaining time for the handshake is estimated by using the following equations:

$$D_e = (N_e(\widetilde{PL}) - 3) * \tau \quad (2)$$

where $N_e = N(m=1) + N(m=24) + N(m=27)$ (3)

and where $\tau$ denotes the transmission interval and $$\tau = \frac{1}{R}$$

and where R denotes the transmission rate.

In equation (3), N(m=k) designates expected transmission times for successfully receiving m packets by a receiver. The receiver has a buffer to store the received packets. Each packet has a sequence number. Each time, the m packets are sent together. This transmission strategy can be found in Section 4.2.3 of specification RFC 4347, "Datagram Transport Layer Security" (http://tools.ietf.org/html/rfc4347).

It is known that the expected transmission time N(m=k) depends on the packet loss rate. It can be show that:

$$N(m=1) = \frac{1}{1-PL} \quad (4)$$

$$N(m=2) = \frac{1+2PL}{1-PL^2} \quad (5)$$

$$N(m) = \sum_{k=1}^{m} \binom{m}{k}(-1)^{k-1}\frac{1}{1-PL^k} \quad (6)$$

As an alternative, values for N(m=24) and N(m=27) can be obtained from a computer simulation.

Then, in step S415, the estimated remaining handshake time $D_e$ and a predetermined handshake timeout $D_r$ are compared. If it is determined in step S415 that the estimated remaining handshake time $D_e$ is smaller than the predetermined handshake timeout $D_r$, i.e., $D_e < D_\tau$, then the procedure branches to step S416 and the transmission rate is not changed. Otherwise, the procedure branches to step S417 and the transmission rate is increased. As an example, the amount of increase can be calculated by using the following equation:

$$R := R * \frac{D_e}{D_r} * 2 \quad (7)$$

Otherwise, if a congestion loss is determined in step S402, the procedure branches to step S403 where the packet loss rate is estimated based on received packets by using the above equation (1). Thereafter, in step S404, the remaining time for the handshake is estimated by using the above equations (2) and (3).

Then, in step S405, the estimated remaining handshake time $D_e$ and the predetermined handshake timeout $D_r$ are compared. If it is determined in step S405 that the estimated remaining handshake time $D_e$ is smaller than the predetermined handshake timeout $D_r$, i.e., $D_e < D_{96}$, then the procedure branches to step S406 and the transmission rate is not changed. Otherwise, the procedure branches to step S407 where 27 packets are sent one by one with a predetermined interval $\mu$ where $\mu >$ process deicty of one node. Then, the transmission interval is increased and the transmission rate is decreased. As an example, the amount of decrease can be calculated by using the following equation:

$$R := \frac{R}{2} \quad (8)$$

Figure 5:
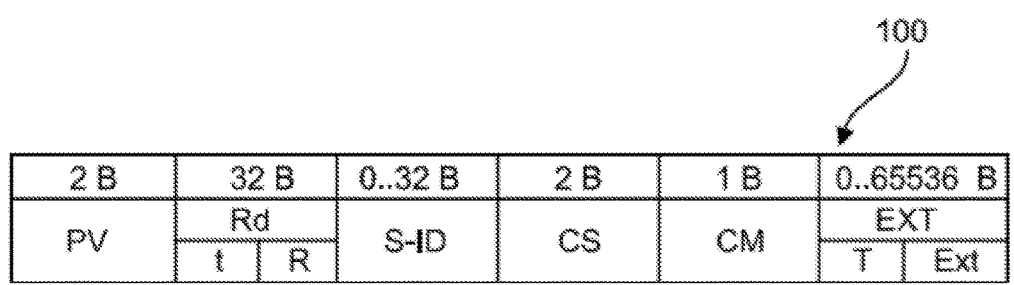
FIG. 5 shows a first message structure of a ClientHello message as used in the first embodiment.

Furthermore, the client side can be notified to prolong the handshake timeout. As an example, the handshake timeout may be doubled, i.e. $D_r := D_\tau * 2$. The notification can be defined as an extension in the ServerHello message of the DTLS handshake. FIG. 5 shows a first message structure of a ClientHello message as used in the first embodiment. The ClientHello message contains a protocol version (PV) of 2 bytes (2B) length, a random section (Rd) of 32 bytes (32B) length with time (t) and random (R) parameters, a session identity (S-ID) of 0 to 32 bytes length, a cipher suite parameter (CS) of 2 bytes length, a compression method (CM) parameter of 1 byte length, and an extension (EXT) field with type (T) and extension (Ext) portion.

Figure 6:
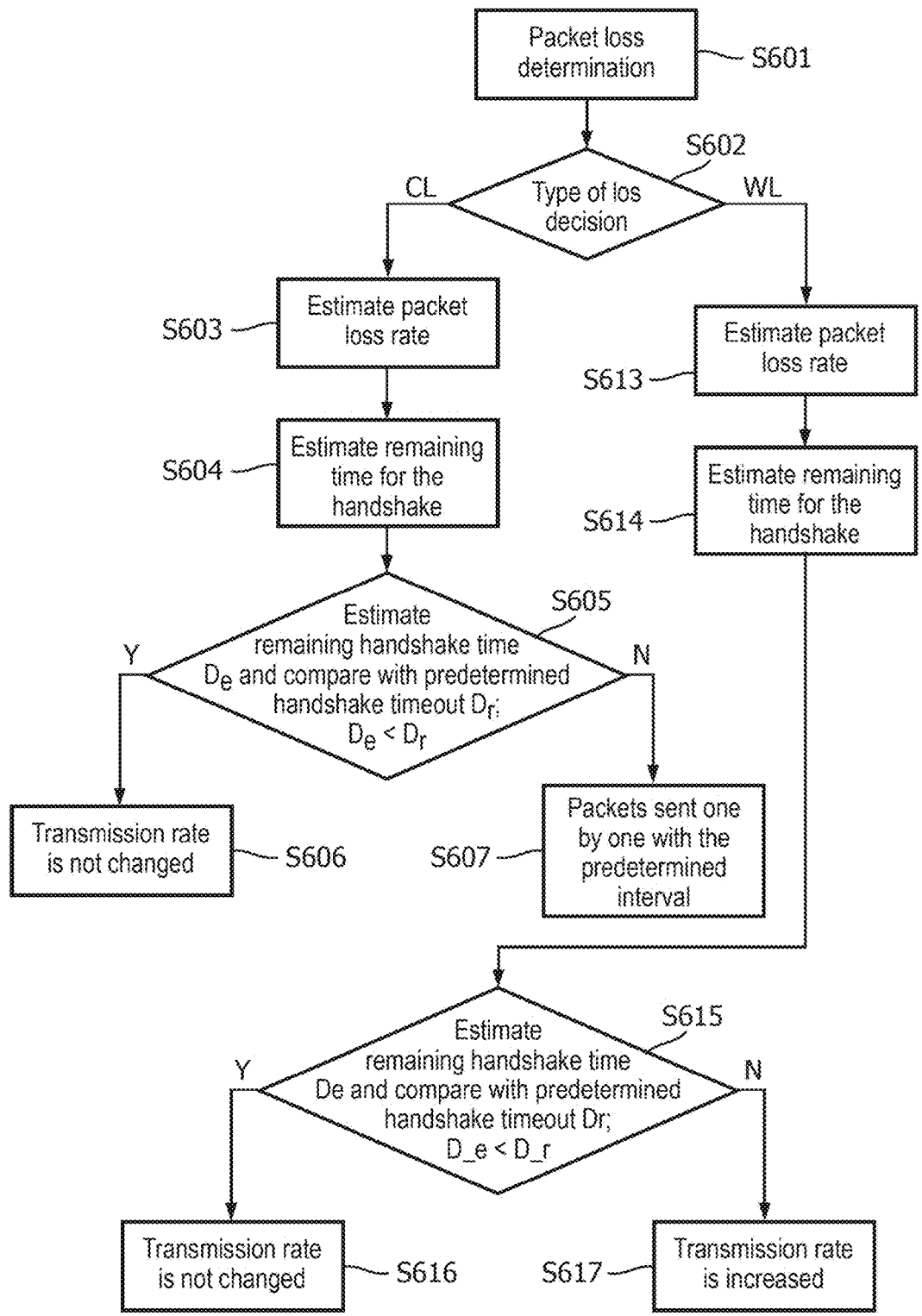
FIG. 6 shows a flow diagram of a client side processing of the handover control scheme for the non-acknowledged packet transmission according to the first embodiment.

FIG. 6 shows a flow diagram of a client side processing of the handover control scheme for the non-acknowledged packet transmission according to the first embodiment.

In step S601, packet loss determination on the client side is performed. The determination on the client side can be based on a notification from the server side about the packet loss or on a direct detection of the packet loss based on the packets received from the server including server messages such as HelloVerifyRequest, Certificate and ServerHelloDone. Since each packet has a serial number, the client can detect the packet loss from the sequence of the packets.

Then, in step S602, a decision on the type of loss is made. The type of loss may based on the following criteria
Does the delay between two continuous receiving vary? If yes, there is congestion loss.
Is the packet loss distributed randomly or is the delay almost equal? If yes, there is wireless loss.

If a wireless loss is determined in step S602, the procedure branches to step S613 where the packet loss rate is estimated based on received packets by using the above equation (1).

Then, in step S614, the remaining time for the handshake is estimated by using the following equations:

$$D_e = (N_e(\widetilde{PL}) - 2) * \tau \quad (9)$$

where $N_e = N(m=1) + N(m=24)$ (10)

and where $\tau$ denotes the transmission interval and $$\tau = \frac{1}{R}$$

and where R denotes the transmission rate.

In equation (10), N(m=k) designates expected transmission times for successfully receiving m packets by a receiver, as explained above in connection with equations (4) to (6). As an alternative, value for N(m=24) can be obtained from a computer simulation.

Then, in step S615, the estimated remaining handshake time $D_e$ and a predetermined handshake timeout $D_r$ are compared. If it is determined in step S615 that the estimated remaining handshake time $D_e$ is smaller than the predetermined handshake timeout $D_r$, i.e., $D_e<D_\tau$, then the procedure branches to step S616 and the transmission rate is not changed. Otherwise, the procedure branches to step S617 and the transmission rate is increased. As an example, the amount of increase can be calculated by using the above equation (7).

Otherwise, if a congestion loss is determined in step S602, the procedure branches to step S603 where the packet loss rate is estimated based on received packets by using the above equation (1). Thereafter, in step S604, the remaining time for the handshake is estimated by using the above equations (2) and (3).

Then, in step S605, the estimated remaining handshake time $D_e$ and the predetermined handshake timeout $D_r$ are compared. If it is determined in step S605 that the estimated remaining handshake time $D_e$ is smaller than the predetermined handshake timeout $D_r$, i.e., $D_e<D_\tau$, then the procedure branches to step S606 and the transmission rate is not changed. Otherwise, the procedure branches to step S607 where 24 packets are sent one by one with the predetermined interval μ where μ>process deicty of one node. Then, the transmission interval is increased and the transmission rate is decreased. As an example, the amount of decrease can be calculated by using the above equation (5).

Furthermore, the handshake timeout can be prolonged. As an example, the handshake timeout may be doubled, i.e. $D_r:=D_r*2$.

Figures 7, 8:
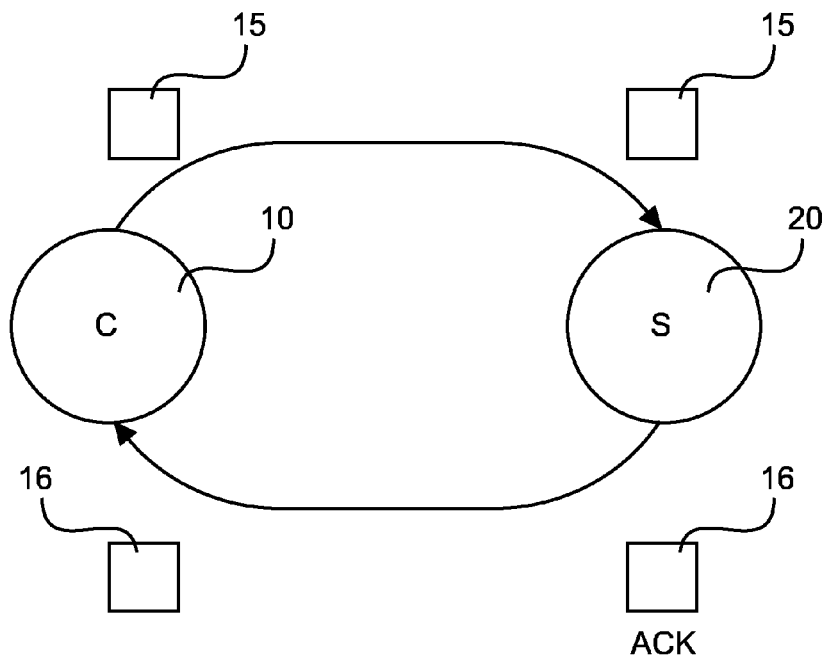
FIG. 7 shows a schematic block diagram of an acknowledged packet transmission between a client and server according to a second embodiment.
FIG. 8 shows a second message structure of a ClientHello message as used in the second embodiment.

FIG. 7 shows a schematic block diagram of an acknowledged packet transmission between a client (C) 10 and a server (S) 20 according to a second embodiment.

In the second embodiment, it is proposed to use a dynamic acknowledgement message or packet (ACK) 16 to acknowledge receipt of a packet 15 and thereby shorten the delay. Moreover, the ACK 16 can be used to estimate packet loss and adjust the transmission strategy accordingly. In both server and client sides there are now three functional blocks to improve DTLS performance in an IP based network. The first functional block is a request block (or requestor) for providing an adaptive request of acknowledgement. The second block is a detection module (or detector) which can calculate the network packet loss rate and estimate the causes of network packet loss based on the calculated packet loss rate, e.g., by using the above equations (4) to (6). The third block is a control block (or controller) which can change the DTLS handshake strategy based on the detection of packet loss and possible causes of the loss.

FIG. 8 shows a second message structure of a ClientHello message as used in the second embodiment. In addition to the fields and parameters of FIG. 5, the second message structure of the ClientHello message contains a cookie field (CK) of 0 to 32 bytes length. The adaptive request for ACK can be defined and signaled in the extension field (EXT), e.g. as a binary flag with value "0" or "1". The server may then take action in response to the receipt of an ACK request in the following manner:

ACK=1→ the server needs to send ACK back to the client;

ACK=0→ the server does not need to send ACK back to client.

Figure 9:
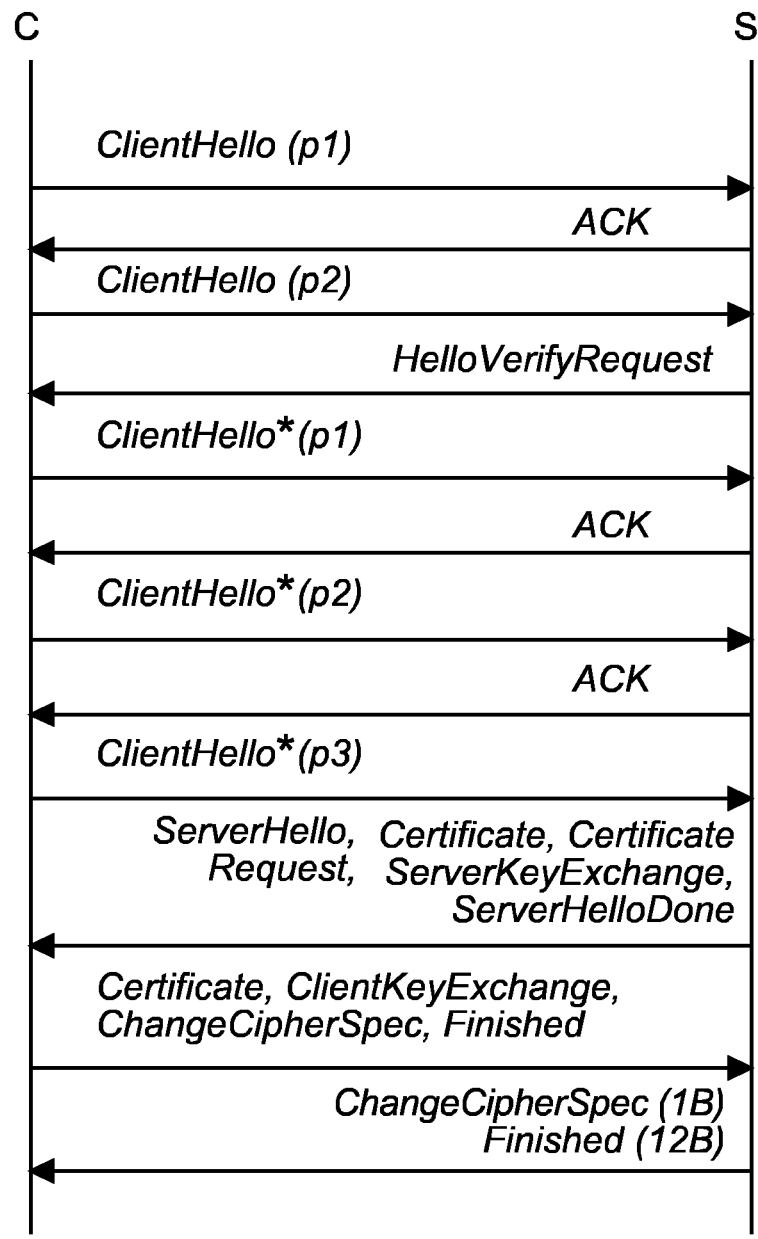
FIG. 9 shows a signaling diagram of a handover interaction between a client and a server according to the second embodiment.

FIG. 9 shows a signaling diagram of a handover interaction between a client and a server according to the second embodiment. The initial ClientHello message is split into two parts p1 and p2 which are both acknowledged by an ACK and the HelloVerifyRequest message, respectively. Additionally, the subsequent ClientHello* message is split into three parts p1 to p3, of which two are acknowledged by ACKs and the last one is acknowledged by a server message, e.g., ServerHello.

In the handshake interaction signalling according to the second embodiment, only the messages ClientHello and ClientHello* comprise an ACK request. The client and server can use records of sent packets and received packets to detect packet loss and estimate the packet loss rate.

Figure 10:
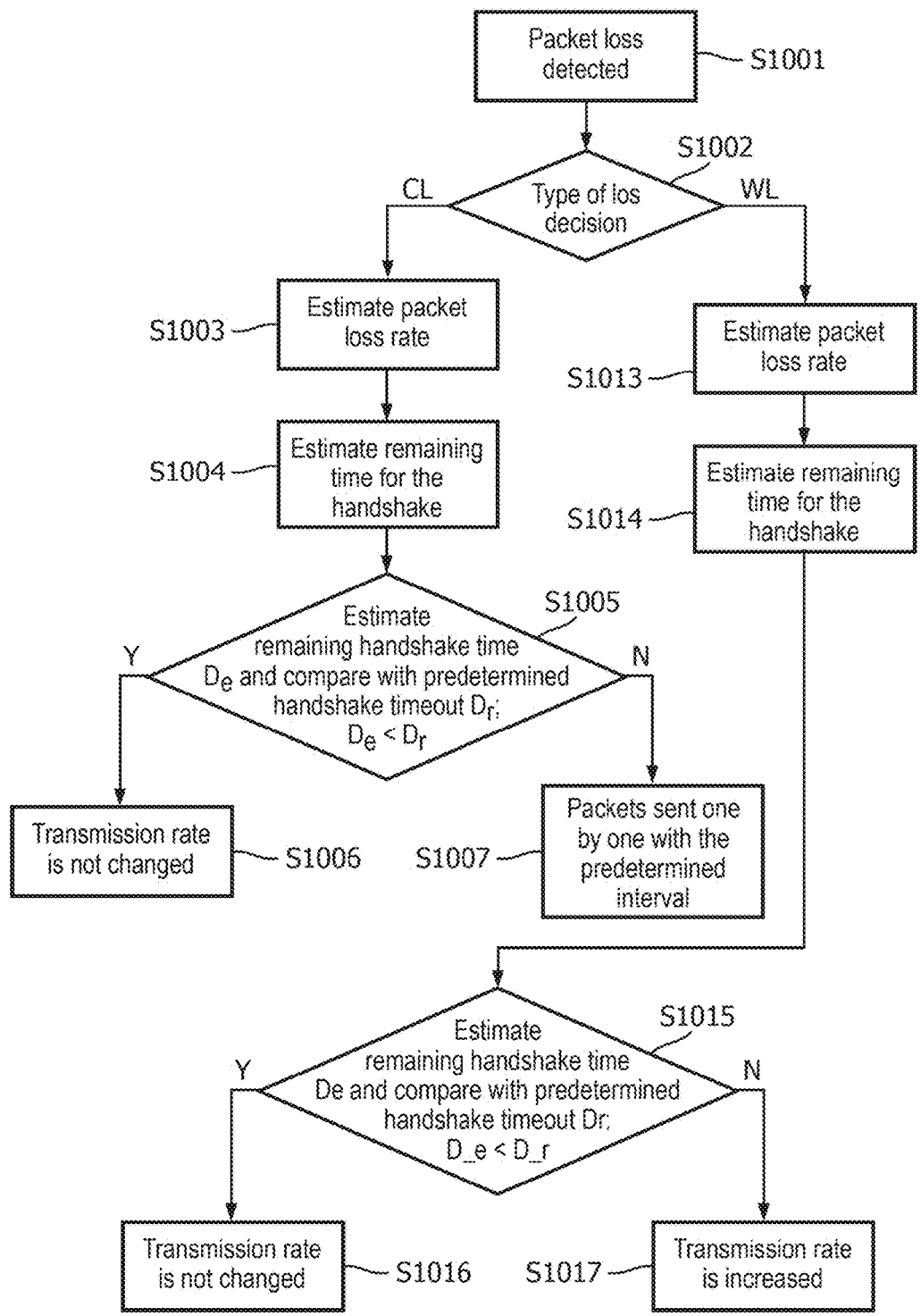
FIG. 10 shows a flow diagram of a server side processing of the handover control scheme for the acknowledged packet transmission according to the second embodiment.

FIG. 10 shows a flow diagram of a server-side processing of the handover control scheme for the acknowledged packet transmission according to the second embodiment. The client side can have a similar approach by detecting the ACK and HelloVerifyRequest message.

In step S1001, the packet loss is detected. The following approaches may be used to detect packet loss at both client and server sides.

If a timeout is detected, the client needs to retransmit the packet. The client can calculate the whole transmission times $N_e$ until receiving the last ACK of ClientHello* from server.

The client can then estimate the packet loss rate by using the following equations:

$$N_c = \frac{4}{(1-P_L)^2} \quad (11)$$

$$P_L = 1 - \frac{2}{\sqrt{N_c}} \quad (12)$$

After receiving the first part (p1) of the ClientHello message, the server will send an ACK. If there is timeout, the server needs to retransmit the packet. The server can calculate the whole transmission times $N_S$ until receiving part 3 (p3) of the ClientHello* message from the client. The server can then estimate the packet loss rate by using the following equations:

$$N_s = \frac{4}{(1-P_L)^2} \quad (13)$$

$$P_L = 1 - \frac{2}{\sqrt{N_s}} \quad (14)$$

Both the client and server will then change the transmission strategy according to the result of the detected packet loss.

In step S1002, a decision on the type of loss is made. This process determines the type of loss according to the following criteria:

Is there disorder between received ClientHello and ClientHello* messages? If yes, there is congestion loss.

Does the delay between two continuously received packets vary? If yes, there is congestion loss.

Is the packet loss distributed randomly or is the delay almost equal? If yes, there is wireless loss.

If a wireless loss is determined in step S1002, the procedure branches to step S1013 where the packet loss rate is estimated as explained above in connection with equations (13) and (14). Then, in step S1014, the remaining time for the handshake is estimated by using the following equations:

$$D_e = (N_e(P_L) - 3) * \tau \quad (15)$$

where $N_e = N(m-1) + N(m=24) + N(m=27)$ (16)

and where $\tau$ denotes the transmission interval and $$\tau = \frac{1}{R}$$

and where R denotes the transmission rate.

In equation (16), (m=k) designates expected transmission times for successfully receiving m packets by a receiver, as explained above in connection with equations (4) to (6). As an alternative, values for N (m=24) and N(m=27) can be obtained from a computer simulation.

Then, in step S1015, the estimated remaining handshake time $D_e$ and a predetermined handshake timeout $D_r$ are compared. If it is determined in step S1015 that the estimated remaining handshake time $D_e$ is smaller than the predetermined handshake timeout $D_r$, i.e., $D_e < D_\tau$, then the procedure branches to step S1016 and the transmission rate is not changed. Otherwise, the procedure branches to step S1017 and the transmission rate is increased. As an example, the amount of increase can be calculated by using the above equation (7).

Otherwise, if a congestion loss is determined in step S1002, the procedure branches to step S1003 where the packet loss rate is estimated based on received packets by using the above equation (1). Thereafter, in step S1004, the remaining time for the handshake is estimated by using the above equations (13) and (14).

Then, in step S1005, the estimated remaining handshake time $D_e$ and the predetermined handshake timeout $D_r$ are compared. If it is determined in step S1005 that the estimated remaining handshake time $D_e$ is smaller than the predetermined handshake timeout $D_r$, i.e., $D_e < D_\tau$, then the procedure branches to step S1006 and the transmission rate is not changed. Otherwise, the procedure branches to step S1007 where the packets are sent one by one with a predetermined interval $\mu$ where $\mu$>process deicty of one node. Then, the transmission interval is increased and the transmission rate is decreased. As an example, the amount of decrease can be calculated by using the above equation (8).

Furthermore, the client side can be notified to prolong the handshake timeout. As an example, the handshake timeout may be doubled, i.e. $D_\tau := D_\tau * 2$. The notification can be defined as an extension in the ServerHello message or part 3 of the ClientHello* message of the DTLS handshake.

Thus, according to the second embodiment, DTLS handshake performance is improved by using a hybrid transmission method in such a way that only ClientHello and ClientHello* require an ACK. The messages with long packets, such as Certificate do not need ACK, which shortens the delay of handshake. Furthermore, the packets and ACKs are used to estimate the packet loss rate. The calculated packet loss rate is used to adjust the transmission strategy so as to improve the performance of DTLS handshake.

To summarize, a method and apparatus for controlling a handshake operation have been described. DTLS is an important secure protocol in the IP based Internet of things. The performance of DTLS handshake can be significantly affected by network status, traffic and packet loss rate, etc. It is therefore suggested evaluating a package loss rate and estimating causes of packet loss. Then, the DTLS handshake strategy may be changed adaptively based on the detection of packet loss and network status. As a result, the successful rate and delay of DTLS handshake can be improved. An acknowledgement and a non-acknowledgement mode may be used in a hybrid way to evaluate the package loss rate and estimate causes of packet loss and eventually improve performance of DTLS handshake.

While the invention has been illustrated and described in detail in the drawings and foregoing description, such illustration and description are to be considered illustrative or exemplary and not restrictive. The invention is not limited to the disclosed embodiments. The proposed handshake processing can be applied to and possibly standardized in other IP based security protocols or IP or lighting control or Internet of things handshake-related applications.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 4, 6 and 10 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for controlling handshake in a packet transmission network, the apparatus comprising:
   a processor to detect packet loss in a handshake-based packet transmission and for estimating a cause of the detected packet loss, and change a handshake strategy of the packet transmission based on the estimated causes, wherein the processor estimates a packet loss rate caused by said estimated cause and to estimate a remaining time for handshake based on the packet loss rate, to compare the remaining time with a predetermined handshake timeout, changes the handshake strategy upon determination that the estimated remaining time is larger than the predetermined handshake timeout, estimates a wireless loss when the detected packet loss is distributed randomly or when delays between each received packet and respective subsequent packet of the received continuous packets are determined by the processor to be equal, and wherein, when the processor has estimated a wireless loss, then the processor estimates a packet loss rate, estimates a remaining time for handshake based on the packet loss rate, to compare the remaining time with a predetermined handshake timeout, and increases a transmission rate of the packet transmission proportional to a ratio between the estimated remaining time for handshake and the predetermined handshake timeout if the estimated remaining time is larger than the predetermined handshake timeout.

2. The apparatus of claim 1, wherein the processor detects the packet loss based on a sequence of received packets.

3. The apparatus of claim 2, wherein the processor detects the packet loss based on a sequence of ClientHello messages of a DTLS handshake signaling.

4. The apparatus of claim 1, wherein the detector processor estimates a congestion loss as the cause of the detected packet loss if a delay between received continuous packets varies or if there is a disorder between received continuous packets.

5. The apparatus of claim 4, wherein, if the processor has estimated a congestion loss, then the processor estimates a packet loss rate, estimate a remaining time for handshake based on the packet loss rate, to compare the remaining time with a predetermined handshake timeout, and to increase a transmission interval and decrease a transmission rate of the packet transmission if the estimated remaining time is larger than the predetermined handshake timeout.

6. The apparatus of claim 1, wherein, when the processor has estimated a congestion loss and when the apparatus is located on a server side of the packet transmission, then the processor notifies a client side of the packet transmission to prolong the handshake timeout.

7. The apparatus of claim 1, wherein the processor estimates the packet loss rate by calculating a total transmission time until receiving the last acknowledgement of a predetermined handshake message and using the equation $$P_L = 1 - \frac{2}{\sqrt{N_s}},$$

wherein $N_S$ denotes the calculated total transmission time and $P_L$ denotes the estimated packet loss rate.

8. The apparatus of claim 6, wherein said predetermined handshake message is a ClientHello message of a DTLS handshake signaling.

9. A method of controlling handshake in a packet transmission network, the method performed by a processor comprising:
   detecting packet loss in a handshake-based packet transmission;
   estimating causes of the detected packet loss;
   estimating a packet loss rate caused by said estimated cause;
   estimating a remaining time for handshake based on the packet loss rate;
   comparing the remaining time with a predetermined handshake timeout; and
   if the estimated remaining time is larger than the predetermined handshake timeout, changing a handshake strategy of the packet transmission based on the estimated causes, and estimating a wireless loss if the detected packet loss is distributed randomly or if delays between each received packet and respective subsequent packet of the received continuous packets are determined by the processor to be equal, and when estimated, by the processor that, a wireless loss exists, estimating a packet loss rate, estimating a remaining time for handshake based on the packet loss rate, to compare the remaining time with a predetermined handshake timeout, and increasing a transmission rate of the packet transmission proportional to a ratio between the estimated remaining time for handshake and the predetermined handshake timeout if the estimated remaining time is larger than the predetermined handshake timeout.

10. A computer program product comprising a plurality of program code portions, stored in a non-transitory computer readable medium, for carrying out the method of claim 9 when run on a computer device.

11. The method according to claim 9, further comprising the following step:
   if the estimated remaining time is smaller than the predetermined handshake timeout, then do not change a handshake strategy of the packet transmission based on the estimated causes.

12. The apparatus of claim 1, wherein the processor does not change the handshake strategy upon determination that the estimated remaining time is smaller than the predetermined handshake timeout.

13. The apparatus of claim 5, wherein the processor estimates the packet loss rate by calculating a total transmission time until receiving the last acknowledgement of a predetermined handshake message and using the equation $$P_L = 1 - \frac{2}{\sqrt{N_s}},$$

wherein $N_S$ denotes the calculated total transmission time and $P_L$ denotes the estimated packet loss rate.

* * * * *